United States Patent
Magadi Rangaiah et al.

(10) Patent No.: US 8,811,978 B2
(45) Date of Patent: Aug. 19, 2014

(54) METHOD AND APPARATUS FOR SENDING MEASUREMENT REPORT MESSAGES FROM A WIRELESS TELECOMMUNICATIONS DEVICE TO A WIRELESS TELECOMMUNICATIONS NETWORK

(75) Inventors: Raghavendra Magadi Rangaiah, West Bromwich (GB); Andrew John Farnsworth, Bromsgrove (GB); Anup Vijay, Wednesbury (GB); Vaibhav Singh, Birmingham (GB)

(73) Assignee: Blackberry Limited, Waterloo (CA)

( * ) Notice: Subject to any disclaimer, the term of this patent is extended or adjusted under 35 U.S.C. 154(b) by 565 days.

(21) Appl. No.: 13/034,823

(22) Filed: Feb. 25, 2011

(65) Prior Publication Data

US 2011/0319028 A1    Dec. 29, 2011

Related U.S. Application Data

(60) Provisional application No. 61/359,002, filed on Jun. 28, 2010.

(51) Int. Cl.
*H04W 24/00*    (2009.01)

(52) U.S. Cl.
USPC ........................................ 455/423; 455/67.11

(58) Field of Classification Search
USPC ......... 455/67.11, 73, 423, 437; 370/232, 253, 370/331–332
See application file for complete search history.

(56) References Cited

U.S. PATENT DOCUMENTS

| | | | | |
|---|---|---|---|---|
| 8,249,580 | B2 * | 8/2012 | Drewes et al. | 455/423 |
| 2010/0273472 | A1 | 10/2010 | Drewes et al. | |
| 2011/0039546 | A1 * | 2/2011 | Narasimha et al. | 455/423 |

FOREIGN PATENT DOCUMENTS

| | | |
|---|---|---|
| JP | 2009290887 | 12/2009 |
| WO | 2009145291 A1 | 12/2009 |

* cited by examiner

*Primary Examiner* — Ping Hsieh

(74) *Attorney, Agent, or Firm* — Novak Druce Connolly Bove + Quigg LLP

(57) ABSTRACT

Apparatus and a method for sending measurement report messages from a wireless telecommunications device to a wireless telecommunications network are disclosed. The method comprises at the wireless telecommunications device: generating a measurement report in respect of a first event; transmitting a first message including the measurement report in respect of the first event to the network; generating a subsequent measurement report for another event; determining whether conditions for the first event are still satisfied and, if so, including in a subsequent message the measurement report for the first event as well as the measurement report for the other event; and transmitting the subsequent message to the network.

6 Claims, 6 Drawing Sheets

METHOD AND APPARATUS FOR SENDING MEASUREMENT REPORT MESSAGES FROM A WIRELESS TELECOMMUNICATIONS DEVICE TO A WIRELESS TELECOMMUNICATIONS NETWORK

CROSS-REFERENCE TO RELATED APPLICATIONS

This application claims the benefit of U.S. Provisional Application No. 61/359,002 filed on Jun. 28, 2010, which is incorporated herein by reference in its entirety.

BACKGROUND

1. Technical Field

This application relates to mobile telecommunications systems in general, having particular application to the field of wireless telecommunications and in particular to the sending of messages from a wireless telecommunications device to a wireless telecommunications network, the messages relating to measurement reports generated by the wireless telecommunications device in general, and in particular relates to a method and apparatus for sending measurement report messages from a wireless telecommunications device to a wireless telecommunications network

2. Description of the Related Art

In a typical mobile radio telecommunications system, mobile user equipment (UE) communicates via one or more radio access radio networks (RANs) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc. and communicate voice and/or data signals with the radio access network.

A radio access network covers a geographical area typically having a plurality of cell areas. Each cell area is served by at least one base station, which may be referred to as a Node B or a base station. Each cell is typically identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

There are thus proposed strategies for sending measurement report messages from a wireless telecommunications device to a wireless telecommunications network. A number of such strategies are detailed below.

Other aspects and features of the proposed strategy will become apparent to those ordinarily skilled in the art upon review of the following description of specific embodiments of a method and apparatus for sending measurement report messages from a wireless telecommunications device to a wireless telecommunications network.

BRIEF DESCRIPTION OF THE DRAWINGS

Embodiments will now be described, by way of example only, with reference to the attached drawings, in which.

DETAILED DESCRIPTION

A method and apparatus for sending measurement report messages from a wireless telecommunications device to a wireless telecommunications network is described. In the following description, for the purposes of explanation, numerous specific details are set forth in order to provide a thorough understanding of the present invention. It will be apparent, however, to one skilled in the art that the technique may be practised without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method for sending measurement report messages from a wireless telecommunications device to a wireless telecommunications network. In other aspects, the invention encompasses apparatus and a computer-readable medium configured to carry out the foregoing actions, as well as a data carrier carrying thereon or therein data indicative of instructions executable by processing means to cause those means to carry out the foregoing actions. Examples are CD-ROMs, memory sticks, dongles, transmitted signals, downloaded files etc. In particular, the method may be implemented in a mobile telecommunications device, with or without voice capabilities, or other electronic devices such as handheld or portable devices.

Figure 1:
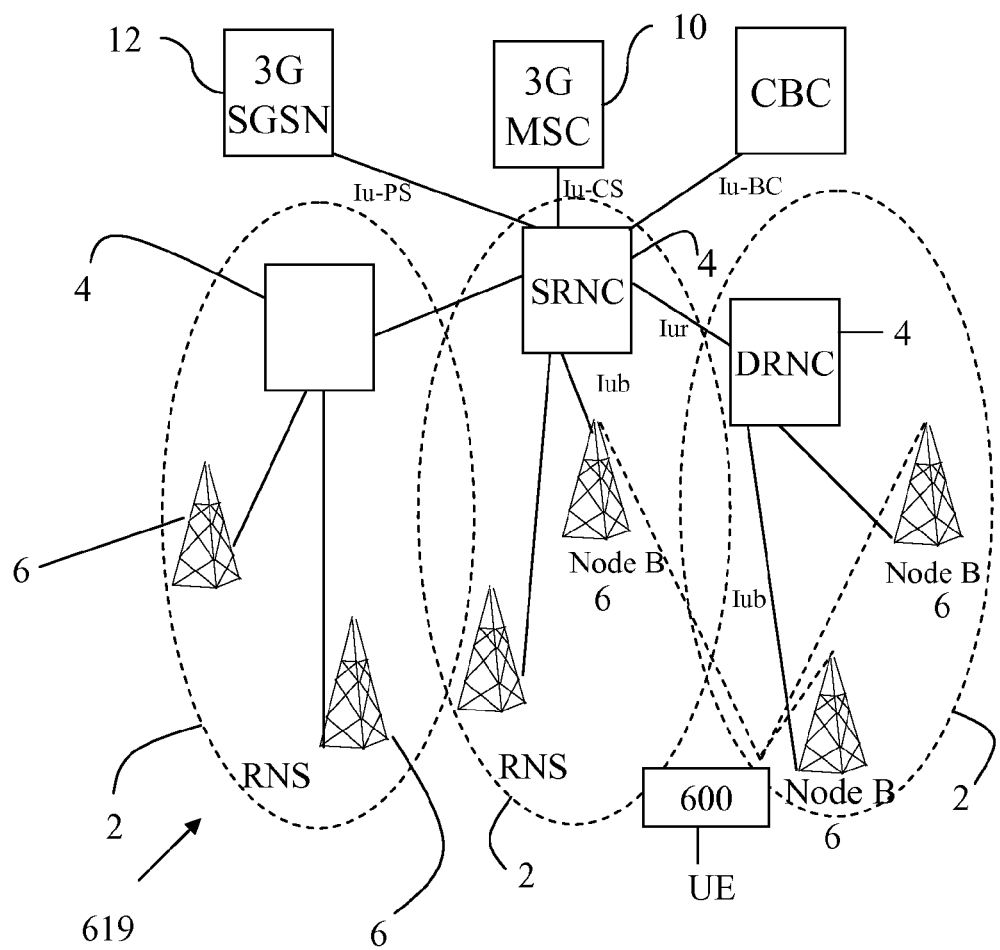
FIG. 1 shows an overview of a network and a user equipment device.

FIG. 1 shows an overview of a network and a UE device. Clearly in practice there may be many UE devices operating with the network but, for the sake of simplicity, FIG. 1 only shows a single UE device 600. For the purposes of illustration, FIG. 1 also shows a network 619 having a few components. It will be clear to a person skilled in the art that in practice a network will include far more components than those shown.

FIG. 1 shows an overview of the radio access network 619 (UTRAN) used in a UMTS system. The network 619 as shown in FIG. 1 comprises three Radio Network Subsystems (RNS) 2. Each RNS has a Radio Network Controller (RNC) 4. Each RNS 2 has one or more Node B 6 which are similar in function to a Base Transmitter Station of a GSM radio access network. User Equipment UE 600 may be mobile within the radio access network. Radio connections (indicated by the straight dotted lines in FIG. 1) are established between the UE and one or more of the Node Bs in the UTRAN.

The radio network controller controls the use and reliability of the radio resources within the RNS 2. Each RNC may also connected to a 3G mobile switching centre 10 (3G MSC) and a 3G serving GPRS support node 12 (3G SGSN).

An RNC 4 controls one or more Node B's. An RNC plus its Node B's together make up an RNS 2. A Node B controls one or more cells. Each cell is uniquely identified by a frequency and a primary scrambling code (primary CPICH in FDD, primary CCPCH in TDD).

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell i.e., there exists one UTRAN access point for each cell. It is the UTRAN-side end point of a radio link. A single physical Node B 6 may operate as more than one cell since it may operate at multiple frequencies and/or with multiple scrambling codes.

Figure 2:
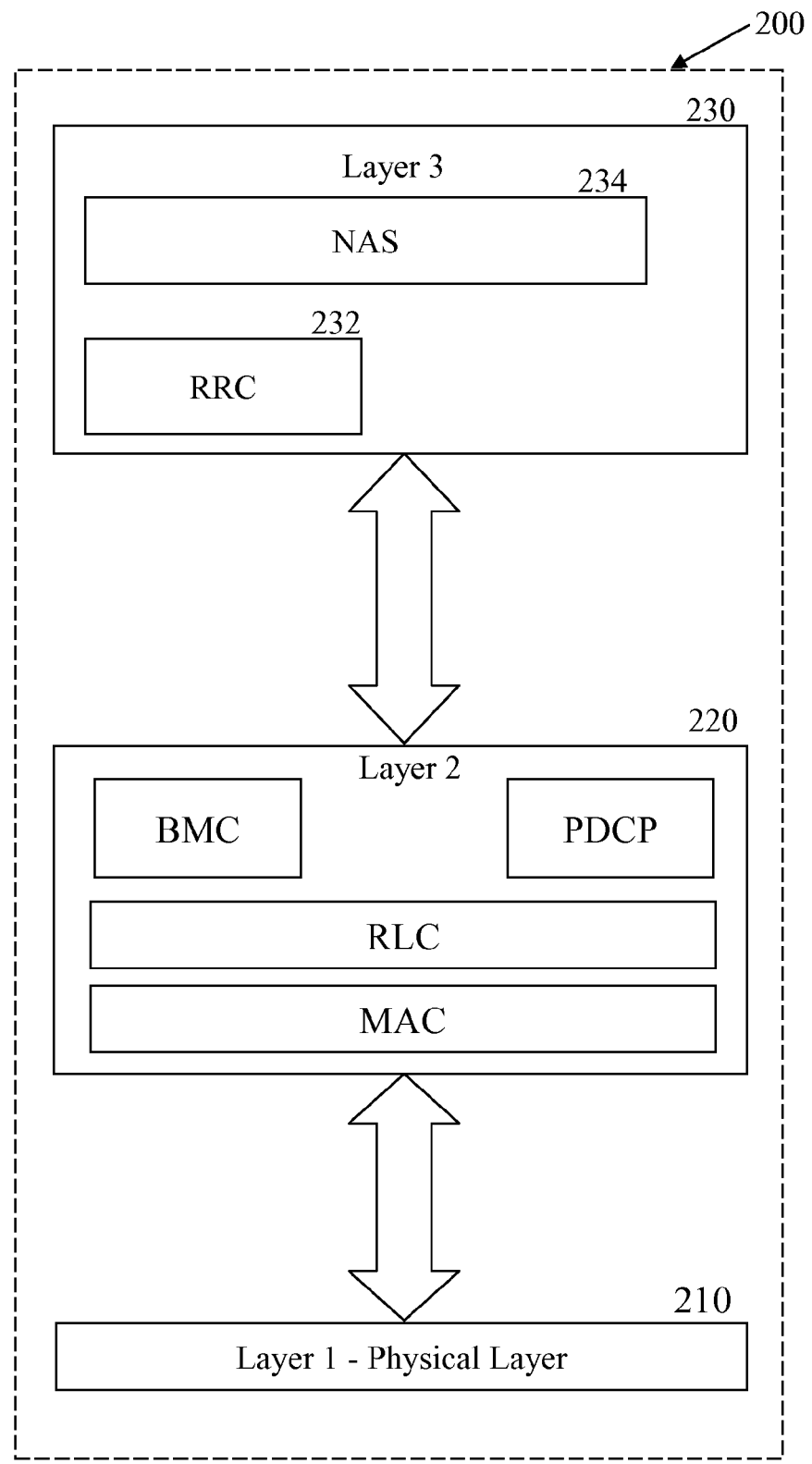
FIG. 2 is a block diagram illustrating an embodiment of a protocol stack apparatus provided with a RRC block, in accordance with the present application.

FIG. 2 is a block diagram illustrating an embodiment of a protocol stack provided in a UE. A Radio Resource Controller (RRC) block 232 is a sub layer of Layer 3 230 of a UMTS protocol stack 200. The RRC 232 exists in the control plane only and provides an information transfer service to the non-access stratum NAS 234. The RRC 232 is responsible for controlling the configuration of radio interface Layer 1 210 and Layer 2 220. When the UTRAN wishes to change the UE configuration it will issue a message to the UE containing a command to invoke a specific RRC procedure. The RRC layer 232 of the UE decodes this message and initiates the appropriate RRC procedure. Generally when the procedure has been completed (either successfully or not) then the RRC sends a response message to the UTRAN (via the lower layers) informing the UTRAN of the outcome. It should be noted that there are a few scenarios where the RRC will not issue a response message to the UTRAN and, in those cases the RRC need not and does not reply.

The strategies for sending measurement report messages from a wireless telecommunications device to a wireless telecommunications network as discussed below with reference to the drawings may be implemented by the RRC block 232.

The technique relates to a method of sending measurement report messages from a wireless telecommunications device to a wireless telecommunications network. The wireless telecommunications device generates a measurement report in respect of a first event. The wireless telecommunications device transmits a first message including the measurement report in respect of the first event to the network. This first message generally elicits a response message from the network, such as an acknowledgment or a message indicating that network has acted upon the message. The wireless telecommunications device then generates a subsequent measurement report for another event. In one embodiment, the wireless telecommunications device determines whether the device has received a response message from the network in respect of the first message and, if not, it includes in a subsequent message the measurement report for the first event as well as the measurement report for the other event and transmits the subsequent message to the network. Before including the measurement report for the first event in the subsequent message the wireless telecommunications device determines whether conditions for the first event are still satisfied and, if so, includes the measurement report for the first event in the subsequent message and, if not, omits the measurement report for the first event from the subsequent message.

The proposed technique relates to the sending of measurement reports from a UE to a network. In the following, reference will be made to particular standards. However it should be understood that the technique is not intended to be limited to any particular mobile telecommunications system. As an aid to understanding and illustrating the technique, reference will be made to 3GPP Technical Standard 25.331 v. 9.2.1, which is herein incorporated by reference in its entirety and will be referred to herein as TS 25.331. It will be clear to a person skilled in the art that the technique may be applied to other telecommunication protocols in which measurement reports may be sent.

TS 25.331 relates to the radio functions of a third generation mobile communications device operable with a UMTS system. Section 14 relates to specific functions undertaken by the UE device and, as an example, section 14.1 relates to intra frequency measurements. As described in section 14.1.1, a measurement quantity is used to evaluate whether an intra-frequency event has occurred or not. Examples of such measurement quantities are given as the downlink $E_c/N_o$, downlink path loss, downlink receive signal code power after despreading, or ISCP measured on a time slot basis.

The network notifies the device of which events should trigger a measurement report from the device. This is achieved by a measurement control signal sent by the network to the device. In the measurement control message there are typically measurement reporting criteria fields in which the events are notified. In the 3GPP specifications, the intra-frequency reporting events are referred as events 1A, 1B, 1C etc, inter frequency reporting events are referred to as events 2A, 2B, 2C etc and so on for other measurement types.

As described in section 14.1.2.1, when an intra frequency measurement configuring event (such as event 1A) is set up, the UE creates a variable "TRIGGERED_1A_EVENT" related to the measurement. When event 1A is configured in the UE, the UE then determines whether for a given cell certain triggering conditions have been fulfilled for a time indicated by a "time-to-trigger" (see section 14.1.5.2 of TS 225.331). If so, and if that cell is not included in a "cells triggered" list in the variable TRIGGERED_1A_EVENT, then the UE includes the cell in the "cells recently triggered" in the variable TRIGGERED_1A_EVENT. This is described on page 1638 of 3GPP TS 25.331 version 9.2.1.

Previously, reporting an event for different neighbouring cells which enter reporting range and satisfy a time-to-trigger in a span of short intervals would result in multiple measurement reports being sent to the network in a short time span. A network with limitations of ignoring certain reports when busy (e.g. already processing previously received messages such as measurement reports or reconfiguration messages) may not be able to update the active set in a timely manner, thus risking the radio connectivity between the UE and the network. Stronger cells may be omitted from the active set depending on the active set size restriction set by the operator. Including in a measurement report for a particular event all cells in the "cells triggered" list means that a network may receive a measurement report relating to a cell that has already been reported but on which the network has not yet acted.

An example that does not implement the proposed technique may be illustrated as follows, using a measurement report in respect of event 1a (e1a) as an example:

UE←MCS←network

At some point in time, the network sends a measurement control signal (MCS) to the device.

UE→e1a(A)→network

The UE sends a measurement report to the network in respect of cell A

UE→e1a(B)→network

The UE sends a measurement report to the network in respect of cell B (however the network may ignore this report because it is handling another procedure)

UE←ASU(A)←network
    The network sends an Active Set Update (ASU) message to the UE, the ASU message from the network being elicited by the measurement report message from the UE relating to cell A
UE→e1a(C)→network
    The UE sends a measurement report to the network in respect of cell C
UE←ASU(C)←network
    The network sends an ASU message to the UE, the ASU message from the network being elicited by the measurement report message from the UE relating to cell C Thus, in the above example, the network misses the measurement report in respect of Cell B as it was busy processing another procedure. Even if cell B is a stronger cell than cell C and reported before cell C it is not added to the active set (AS) by the network. Subsequently, Cell B may be added to the AS once a periodical e1a measurement report is sent, but only if there is still a slot available in the AS.

An alternative method of sending event measurement reports (such as e1a measurement reports) is proposed such that any cells in the "cells triggered" list will be sent each time a measurement report for the same event (e.g. e1a) is sent for any cell. In the proposed technique, all cells in the "cells triggered" list are sent each time an event 1A measuring report is sent for any cell.

There is therefore provided a method of sending measurement report messages from a wireless telecommunications device to a wireless telecommunications network, the method comprising at the wireless telecommunications device: generating a measurement report in respect of a first event; transmitting a first message including the measurement report in respect of the first event to the network; generating a subsequent measurement report for another event; determining whether conditions for the first event are still satisfied and, if so, including in a subsequent message the measurement report for the first event as well as the measurement report for the other event; and transmitting the subsequent message to the network.

The first message may be intended to elicit a response message from the network. The method may further comprise determining whether the device has received a response message from the network in respect of the first message prior to determining whether conditions for the first event are still satisfied. Examples of a response message from the network in respect of the first message are an Active Set Update (ASU) message from the network in response to the first message or an acknowledgment message from the network. The wireless telecommunications device recognises these as a response message from the network in respect of the first message.

In particular, the method comprises: generating a measurement report in respect of a first event, for instance a UMTS measurement report for event 1a for a first cell; transmitting to the network a first message including the measurement report in respect of an event 1a for a first cell, which first message is intended to elicit a response message from the network; generating a subsequent measurement report for another event, for instance a UMTS measurement report for event 1a for a second cell; determining whether conditions for the first event are still satisfied and, if so, including in a subsequent message the measurement report for the event 1a for the first cell as well as the measurement report for the event 1a for the second cell; and transmitting the subsequent message to the network. The method may also comprise the operation of determining whether the device has received a response message from the network in respect of the first message and, if not, determining whether conditions for the first event are still satisfied and, if so, including in a subsequent message the measurement report for the event 1a for the first cell as well as the measurement report for the event 1a for the second cell; and transmitting the subsequent message to the network.

Figure 3:
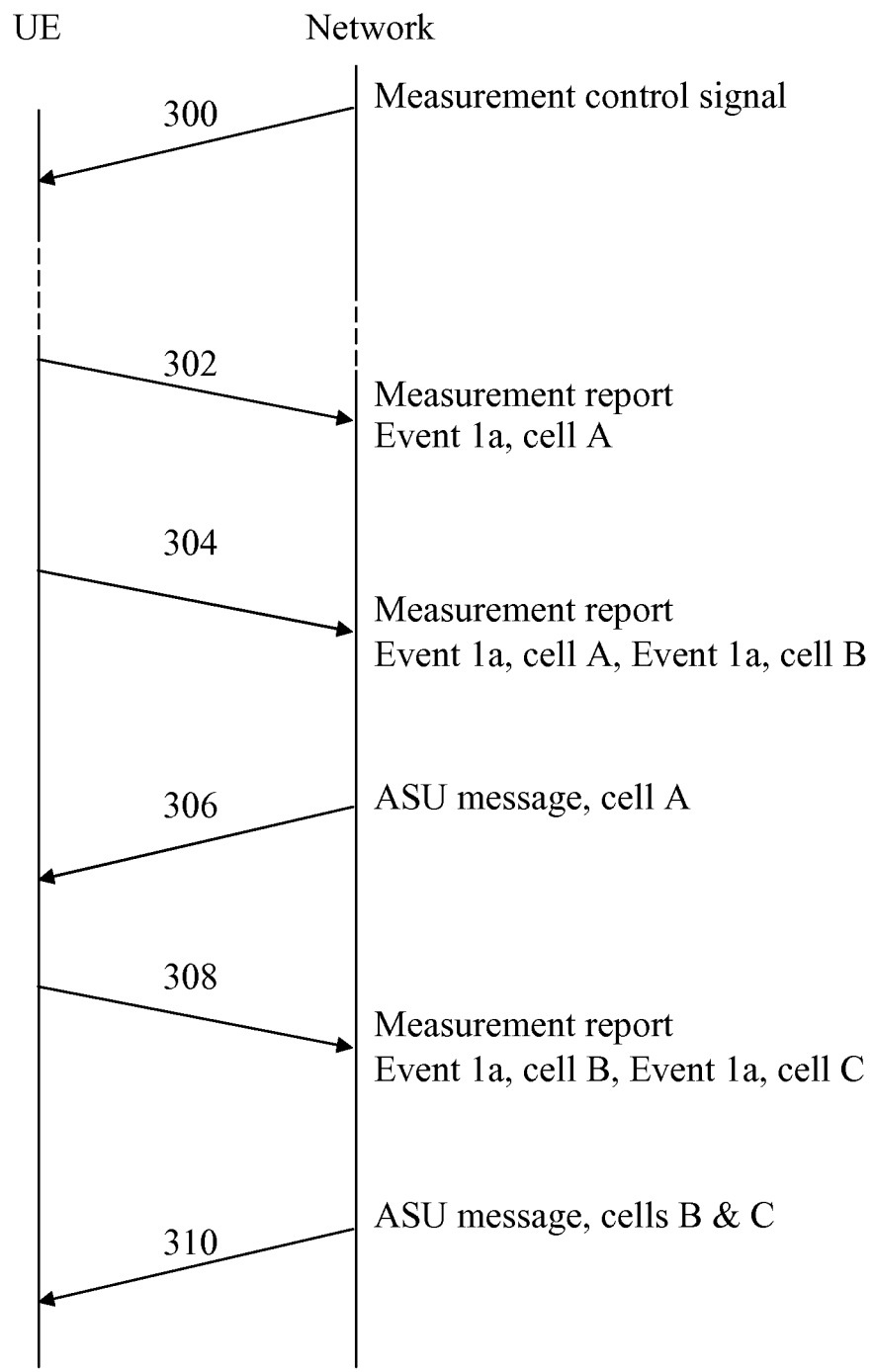
FIG. 3 is a diagram illustrating measurement report messages and responses transmitted between a device and the network.

An example of this proposed technique will now be described, again using a measurement report in respect of event 1a (e1a) as an example, with reference to FIG. 3 of the drawings.

Example 1

UE←MCS←network
    Network sends a measurement control signal (MCS) to the device (operation 300). This may occur relatively early in the sequence of radio communications between the UE and the network.
UE→e1a(A)→network
    UE sends a measurement report to the network in respect of cell A (operation 302).
UE→e1a(A, B)→network
    The UE then sends a measurement report to the network in respect of cells A and B, the device for instance not having received a message from the network elicited by the previous measurement report for cell A (operation 304) or the conditions for the first event for cell A are still satisfied (i.e. the cell is in the "cells triggered" list) (however the network may ignore this report because it is already handling the previously received measurement report relating to cell A).
UE←ASU(A)←network
    The UE then receives an ASU message from the network in response to the measurement report sent by the UE in respect of cell A (operation 306).
UE→e1a(B, C)→network
    The UE then sends the measurement report triggered by cell C. In this measurement report is included the measurement report for cell B, which has not yet been acknowledged by the network (operation 308) and/or is still in the "cells triggered" list.
UE←ASU(B, C)←network
    The network then sends a message to the UE in relation to cell B and cell C (operation 310).

Thus the network gets information relating to cells that have triggered a measurement report but for which the UE has not yet received confirmation that the measurement report has been acted upon by the network. The network is therefore able to add to the active set the best cell that the UE is measuring. The number of reports sent to the network is also reduced as repeat measurement report information for cells is included in the measurement report for other cells rather than being sent as a repeat message. In addition the number of messages (e.g. Active Set Updates (ASU) messages) sent by the network may be reduced as the networks may send one message in relation to all cells included in a measurement report.

Figure 4:
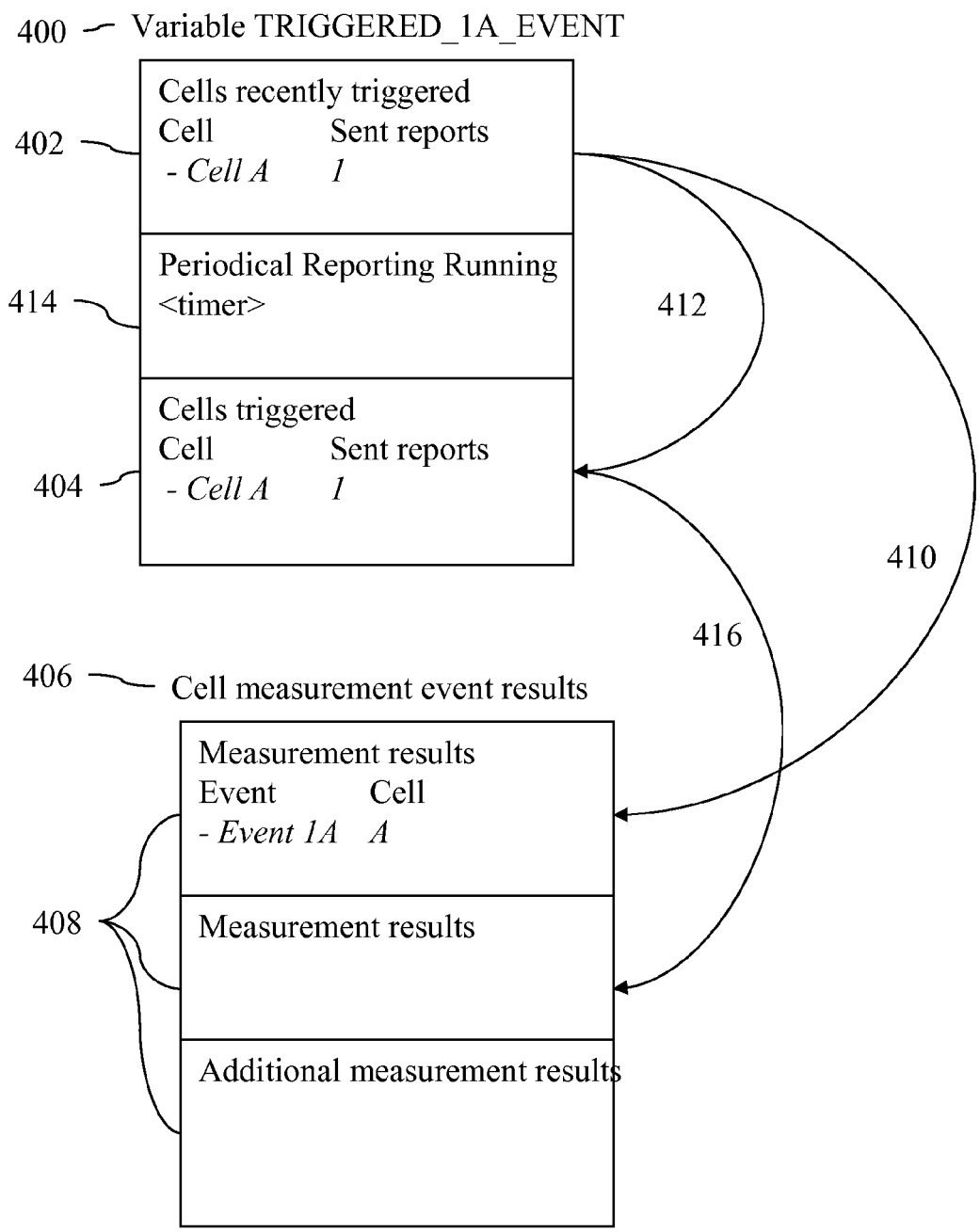
FIG. 4 is a diagram illustrating examples of the status of various variables in a UE in which the technique is implemented.

FIG. 4 illustrates some of the variables used in 3GPP Technical Specification Number 25.331 and how these may be used in the proposed technique. When an intra frequency measurement configuring event (such as event 1A) is set up, the UE creates a variable "TRIGGERED_1A_EVENT" 400 related to the measurement. When event 1A is configured in the UE, the UE then determines whether for a given cell certain triggering conditions have been fulfilled for a time indicated by a "time-to-trigger". If so, then the UE includes the cell in the "cells recently triggered" list 402 in the variable TRIGGERED_1A_EVENT 400. If that cell is included in a "cells triggered" list 404 (to be discussed below) in the variable TRIGGERED_1A_EVENT 400, then the UE increments the "sent reports" field for that cell.

When the measurement report is ready to send, the UE then puts the measurement report for the cell (indicated by reference 410) into the variable "Cell measurement event results" 406. The variable "Cell measurement event results" may have a plurality of fields 408 into which measurement results are entered (e.g. measurement result for event 1a from cell A as shown in the top field 408). When measurement reports for a cell are placed into the variable "Cell measurement event results" (as indicated by reference 410) the information about the cell is also moved from the "cells recently triggered" list 402 to the "cells triggered" list 404, as indicated by reference 412. Thus the "Cells triggered" list 404 includes a list of cells (e.g. Cell A) that have been reported to the network for the specific event 400.

When an Active Set Update message has been received from the network in respect of a particular cell (e.g. cell A), the cell's details are removed from the "cells triggered" list 404. If an ASU message has not been received within a "Periodical reporting" time 414, then the UE sends another measurement report in respect of event 1a for cell A and the number of "sent reports" in the "cells triggered" list 402 for that cell is incremented. However, if the cell concerned (e.g. cell A) no longer meets the criteria for triggering a measurement report, the information for that cell is removed from the "cells triggered" list 404 and another measurement report in respect of event 1a for cell A is not transmitted.

When the next measurement report for event 1a is to be generated, (for instance for another cell or for a periodical report) the UE not only enters into the "Cell measurement results" the measurement results for the event to be reported but also the cell measurement results for any cells that are listed in the "cells triggered" list 404, as indicated by reference 416. For instance if a new cell (Cell B) and a previously reported cell (Cell A) are listed in the "cells triggered" list 404, the next measurement report for event 1a therefore includes measurement results for Cell B and Cell A. As mentioned above, once the UE receives an Active Set Update message from the network in respect of a particular cell, the cell's details are removed from the "cells triggered" list 404 and measurement results for this cell will no longer be added to the "cell measurement event results" until further measurement events are triggered for that cell.

An example of possible changes to 3GPP Technical Specification 25.331 section 14.1.2.1 to implement the proposed technique is given below:

Wording of TS25.331 v 9.1.0 s. 14.1.2.1:
UE may . . .
2> send a measurement report with IEs set as below:
    3> set in "intra-frequency measurement event results": "Intrafrequency event identity" to "1a"; and
    3> include in "cell measurement event results" all entries of the "cells recently triggered" in the variable TRIGGERED_1A_EVENT in descending order according to the configured measurement quantity taking into account the cell individual offset for each of those cells;
    3> set the IE "measured results" and the IE "additional measured results" according to subclause 8.4.2, not taking into account the cell individual offset for each cell.
2> move all entries from "cells recently triggered" to "cells triggered" in the variable TRIGGERED_1A_EVENT.

Example of possible change to s.14.1.2.1 to implement the proposed technique:
UE may . . .
2> move all entries from "cells recently triggered" to "cells triggered" in the variable TRIGGERED_1A_EVENT.
2> send a measurement report with IEs set as below:
    3> set in "intra-frequency measurement event results": "Intrafrequency event identity" to "1a"; and
    3> include in "cell measurement event results" all entries of the "cells triggered" in the variable TRIGGERED_1A_EVENT in descending order according to the configured measurement quantity taking into account the cell individual offset for each of those cells;
    3> set the IE "measured results" and the IE "additional measured results" according to subclause 8.4.2, not taking into account the cell individual offset for each cell.

Figure 5:
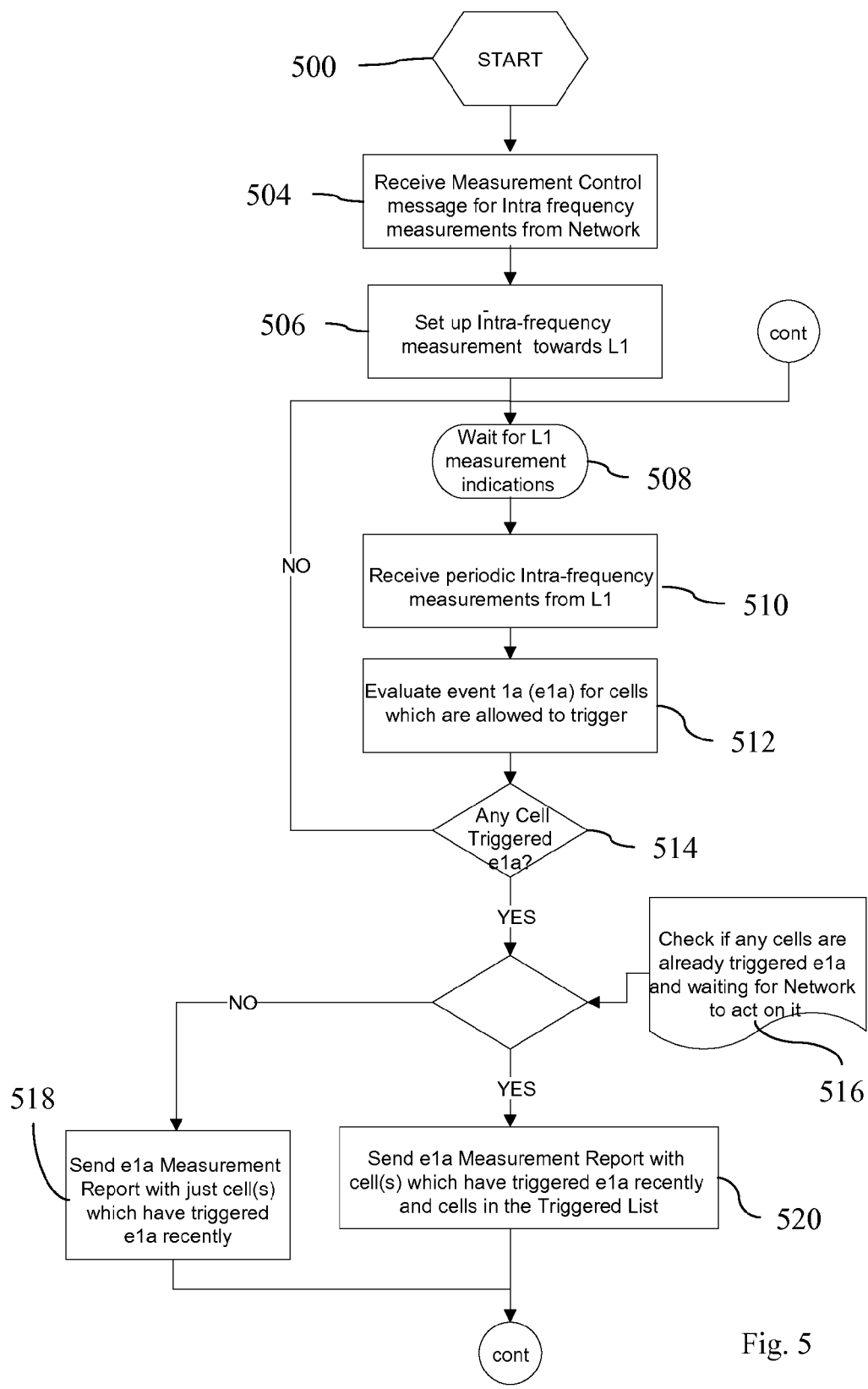
FIG. 5 is a flow chart illustrating an example implementation of the technique.

FIG. 5 is a flow diagram illustrating the technique described, again in relation to event 1a reports. In the example shown, the technique starts (500) when the UE receives a measurement control message for Intra-frequency measurements from the network (operation 504) (for instance to configure E1a reporting). The UE then sets up the Intra-frequency measurement towards Layer 1 (L1) (operation 506). In state 500 the UE may be in Cell DCH. A call may be in progress.

The UE then waits for the L1 measurement indications (operation 508). The UE receives periodic Intra-frequency measurements from L1 (510) and evaluates whether the conditions for event 1a are met for cells that are allowed to trigger the event (512). The UE then determines whether any cell has triggered an event 1a (514). This corresponds to whether there are any cells in the "cells recently triggered" list 402 of FIG. 4. If this is answered in the negative, the UE continues to wait for L1 measurement indications (508). However, if answered in the affirmative, the UE checks if any cells have already triggered e1a and have been reported to the network and if the UE is waiting for the network to act on such a report (516). This corresponds to determining whether there are any entries in the "cells triggered" list 404 shown in FIG. 4. If this is answered in the negative, then the UE sends a Measurement Report (518) with just cell(s) which have triggered e1a recently (i.e. those in the "cells recently triggered" list 402 of FIG. 4). If answered in the affirmative, then the UE sends a Measurement Report with both cell(s) which have triggered e1a recently (i.e. those in the "cells recently triggered" list 402 of FIG. 4) and any cells that have already triggered e1a and on which the UE is waiting for the network to act (i.e. those cells in the "cells triggered" list 404 of FIG. 4).

Although the technique has been described with reference to a measurement report in respect of event 1a in UMTS, the technique is applicable to other measurement reports as well (e.g. events 1b, 1c, etc, events 2a, 2b, 2c etc and so on in UMTS and other measurement reports in other radio access networks (for instance LTE). The technique has application in relation to measurement reports in respect of intra-frequency reporting events, inter-frequency reporting events, inter-RAT reporting events, traffic volume reporting events, quality reporting events, UE internal measurement reporting events, UE positioning reporting events and so on.

Thus, when a UE sends to a network a measurement report message, when the UE is next ready to report another measurement report, the UE determines whether conditions for the first event are still satisfied and, if so, the UE resends the results of the previous measurement report with the current measurement report. In a further embodiment, when a UE sends to a network a measurement report message that is expected to elicit a response from the network, when the UE is next ready to report another measurement report and has not yet received a response from the network in response to the previous measurement report message sent, then the UE resends the results of the previous measurement report with the current measurement report.

Figure 6:
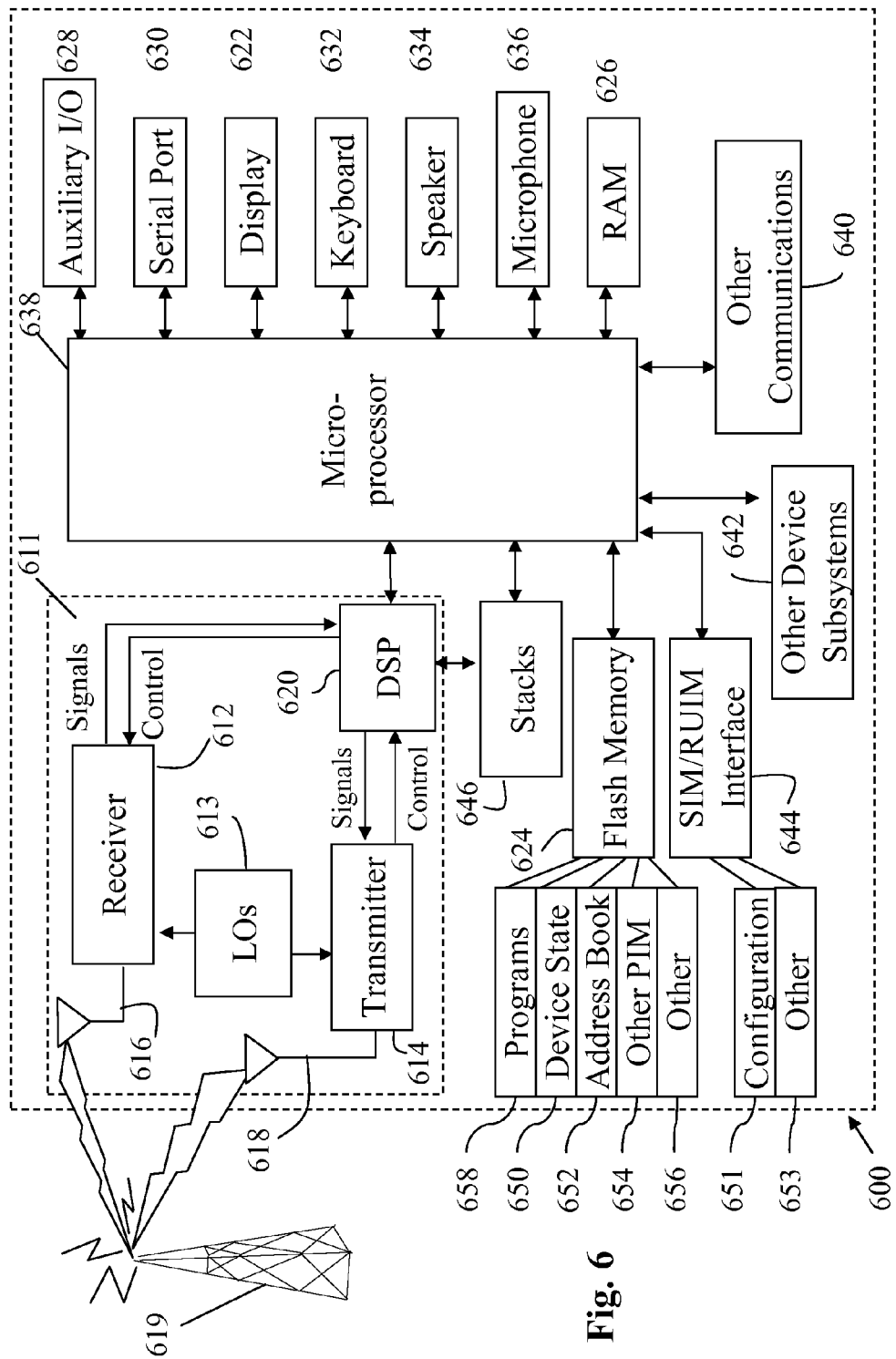
FIG. 6 is a block diagram illustrating a mobile device, which can act as a UE and co-operate with the apparatus and methods of FIGS. 1 to 5.

Turning now to FIG. 6, FIG. 6 is a block diagram illustrating a mobile device, which can act as a UE and co-operate with the apparatus and methods of FIGS. 1 to 2, and which is an exemplary wireless communication device. Mobile station 600 is preferably a two-way wireless communication device having at least voice and data communication capabilities. Mobile station 600 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 600 is enabled for two-way communication, it will incorporate a communication subsystem 611, including both a receiver 612 and a transmitter 614, as well as associated components such as one or more, preferably embedded or internal, antenna elements 616 and 618, local oscillators (LOs) 613, and processing means such as a processing module such as a digital signal processor (DSP) 620. As will be apparent to those skilled in the field of communications, the particular design of the communication subsystem 611 will be dependent upon the communication network in which the device is intended to operate. For example, mobile station 600 may include a communication subsystem 611 designed to operate within the Mobitex™ mobile communication system, the DataTAC™ mobile communication system, GPRS network, UMTS network, or EDGE network.

Network access requirements will also vary depending upon the type of network 602. For example, in the Mobitex and DataTAC networks, mobile station 600 is registered on the network using a unique identification number associated with each mobile station. In UMTS and GPRS networks, however, network access is associated with a subscriber or user of mobile station 600. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 600 will be unable to carry out any other functions involving communications over the network 602. The SIM interface 644 is normally similar to a card-slot into which a SIM card can be inserted and ejected like a diskette or PCMCIA card. The SIM card can have approximately 64K of memory and hold many key configuration 651, and other information 653 such as identification, and subscriber related information.

When required network registration or activation procedures have been completed, mobile station 600 may send and receive communication signals over the network 602. Signals received by antenna 616 through communication network 602 are input to receiver 612, which may perform such common receiver functions as signal amplification, frequency down conversion, filtering, channel selection and the like, and in the example system shown in FIG. 6, analog to digital (A/D) conversion. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 602 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Mobile station 600 preferably includes processing means such as a microprocessor 638 which controls the overall operation of the device. Communication functions, including at least data and voice communications, are performed through communication subsystem 611. Microprocessor 638 also interacts with further device subsystems such as the display 622, flash memory 624, random access memory (RAM) 626, auxiliary input/output (I/O) subsystems 628, serial port 630, keyboard 632, speaker 634, microphone 636, a short-range communications subsystem 640 and any other device subsystems generally designated as 642.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the microprocessor 638 is preferably stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626.

As shown, flash memory 624 can be segregated into different areas for both computer programs 658 and program data storage 650, 652, 654 and 656. These different storage types indicate that each program can allocate a portion of flash memory 624 for their own data storage requirements. Microprocessor 638, in addition to its operating system functions, preferably enables execution of software applications on the mobile station. A predetermined set of applications that control basic operations, including at least data and voice communication applications for example, will normally be installed on mobile station 600 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 602. In a preferred embodiment, the PIM data items are seamlessly integrated, synchronized and updated, via the wireless network 602, with the mobile station user's corresponding data items stored or associated with a host computer system. Further applications may also be loaded onto the mobile station 600 through the network 602, an auxiliary I/O subsystem 628, serial port 630, short-range communications subsystem 640 or any other suitable subsystem 642, and installed by a user in the RAM 626 or preferably a non-volatile store (not shown) for execution by the microprocessor 638. Such flexibility in application installation increases the functionality of the device and may provide enhanced on-device functions, communication-related functions, or both. For example, secure communication applications may enable electronic commerce functions and other such financial transactions to be performed using the mobile station 600.

In a data communication mode, a received signal such as a text message or web page download will be processed by the communication subsystem 611 and input to the microprocessor 638, which preferably further processes the received signal for output to the display 622, or alternatively to an auxiliary I/O device 628. A user of mobile station 600 may also compose data items such as email messages for example, using the keyboard 632, which is preferably a complete alphanumeric keyboard or telephone-type keypad, in conjunction with the display 622 and possibly an auxiliary I/O device 628. Such composed items may then be transmitted over a communication network through the communication subsystem 611.

For voice communications, overall operation of mobile station 600 is similar, except that received signals would preferably be output to a speaker 634 and signals for transmission would be generated by a microphone 636. Alternative voice or audio I/O subsystems, such as a voice message recording subsystem, may also be implemented on mobile station 600. Although voice or audio signal output is preferably accomplished primarily through the speaker 634, display 622 may also be used to provide an indication of the identity of a calling party, the duration of a voice call, or other voice call related information for example.

Serial port 630 in FIG. 6, would normally be implemented in a personal digital assistant (PDA)-type mobile station for which synchronization with a user's desktop computer (not shown) may be desirable, but is an optional device component. Such a port 630 would enable a user to set preferences through an external device or software application and would extend the capabilities of mobile station 600 by providing for information or software downloads to mobile station 600 other than through a wireless communication network. The alternate download path may for example be used to load an encryption key onto the device through a direct and thus reliable and trusted connection to thereby enable secure device communication.

Other communications subsystems 640, such as a short-range communications subsystem, is a further optional component which may provide for communication between mobile station 600 and different systems or devices, which need not necessarily be similar devices. For example, the subsystem 640 may include an infrared device and associated circuits and components or a Bluetooth™ communication module to provide for communication with similarly enabled systems and devices.

When mobile device 600 is used as a UE, protocol stacks 646 include apparatus and a method for [title].

EXTENSIONS AND ALTERNATIVES

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a UE or UTRAN or other user equipment or access network components, a combination of multiple such components for example in communication with one another or a sub-network or full network of such components.

Embodiments have been described herein in relation to 3GPP specifications. However the method and apparatus described are not intended to be limited to the specifications or the versions thereof referred to herein but may be applicable to future versions or other specifications or protocols.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

What is claimed is:

1. A method of sending measurement report messages from a wireless telecommunications device to a wireless telecommunications network, the method comprising at the wireless telecommunications device:
    generating a measurement report in respect of an intra-frequency reporting event 1a for a first cell;
    transmitting a first message including the measurement report in respect of the intra-frequency reporting 1a event for the first cell to the network;
    generating a subsequent measurement report for an intra-frequency reporting event 1a for another cell;
    when generating the subsequent message including the subsequent measurement report, determining whether conditions for the intra-frequency reporting event 1a are still satisfied for the first cell and, if so, including in the subsequent message the measurement report for the intra-frequency reporting event 1a for the first cell as well as the measurement report for the intra-frequency reporting event 1a for the second cell; and
    transmitting the subsequent message to the network.

2. The method as claimed in claim 1 further comprising determining whether the device has received a response message from the network in respect of the first message prior to determining whether conditions for the first event are still satisfied.

3. A non-transitory computer-readable medium having computer-executable instructions adapted to cause a device to perform the method of claim 1.

4. A non-transitory data carrier carrying thereon or therein data indicative of instructions executable by processing means to cause those means to carry out a method according to claim 1.

5. A wireless telecommunications device comprising:
    a transceiver for transmitting and receiving radio signals;
    a processor; and
    generate a measurement report in respect of an intra-frequency reporting event 1a for a first cell;
    transmit a first message including the measurement report in respect of the intra-frequency reporting event 1a for the first cell to the network;

generate a subsequent measurement report for an intra-frequency reporting event 1*a* for another cell;
generate a subsequent message including the subsequent measurement report,
when generating the subsequent message including the subsequent measurement report determine whether conditions for the intra-frequency reporting event 1*a* are still satisfied for the first cell and, if so, include in the subsequent message the measurement report for the intra-frequency reporting event 1*a* for the first cell as well as the measurement report for the intra-frequency reporting event 1*a* for the second cell; and
transmit the subsequent message to the network.

6. The device as claimed in claim 5 wherein the one or more routines are adapted to determine whether the device has received a response message from the network in respect of the first message prior to determining whether conditions for the first event are still satisfied.

\* \* \* \* \*